United States Patent [19]

Cappa

[11] Patent Number: 5,032,466
[45] Date of Patent: Jul. 16, 1991

[54] SEMI-RIGID STRATIFIED SHIELD

[75] Inventor: Arnaldo C. Cappa, Montano Lucino, Italy

[73] Assignee: Lasar S.P.A., Milan, Italy

[21] Appl. No.: 257,225

[22] Filed: Oct. 13, 1988

[30] Foreign Application Priority Data

Oct. 16, 1987 [IT] Italy ................................ 22301 A/87

[51] Int. Cl.$^5$ ............................................. F41H 5/04
[52] U.S. Cl. .................................. 428/625; 428/245; 89/36.02
[58] Field of Search ................. 89/36.02, 36.08, 36.09, 89/40.03; 114/14; 428/544, 624, 625, 469, 472, 221, 224, 225, 245, 286, 287, 246, 252

[56] References Cited

U.S. PATENT DOCUMENTS

| D. 146,238 | 1/1947 | Smart | 89/36.08 |
|---|---|---|---|
| 1,203,962 | 11/1916 | Bellamore | 89/36.08 |
| 1,791,701 | 2/1931 | Beal | 89/36.08 |
| 2,361,570 | 10/1944 | Riboud | 89/36.08 |
| 2,718,829 | 9/1955 | Seymour et al. | 89/36.02 |
| 3,232,017 | 2/1966 | Prusinski et al. | 89/36.02 |
| 3,431,818 | 3/1969 | King | 89/36.02 |
| 3,516,898 | 6/1970 | Cook | 161/93 |
| 3,649,426 | 3/1972 | Gates | 89/36.02 |
| 3,700,534 | 10/1972 | Cook | 89/36.02 |
| 3,776,094 | 12/1973 | Giles et al. | 89/36.02 |
| 3,924,038 | 12/1975 | McArdle | 89/36.02 |
| 4,030,427 | 6/1977 | Goldstein | 109/82 |
| 4,061,815 | 12/1977 | Poole | 428/215 |
| 4,398,446 | 8/1983 | Pagano et al. | 89/36.08 |
| 4,489,663 | 12/1984 | Poag et al. | 109/76 |

FOREIGN PATENT DOCUMENTS

| 41271 | 12/1981 | European Pat. Off. | 89/36.02 |
|---|---|---|---|
| 49014 | 4/1982 | European Pat. Off. | |
| 241641 | 10/1987 | European Pat. Off. | |
| 1213305 | 3/1966 | Fed. Rep. of Germany | 89/36.02 |
| 1952759 | 4/1970 | Fed. Rep. of Germany | |
| 2103762 | 8/1972 | Fed. Rep. of Germany | 89/36.08 |
| 2815582 | 3/1980 | Fed. Rep. of Germany | 89/36.02 |
| 3134341 | 2/1985 | Fed. Rep. of Germany | |
| 3228264 | 6/1985 | Fed. Rep. of Germany | |
| 1581760 | 9/1969 | France | 89/36.02 |
| 1142689 | 2/1969 | United Kingdom | |
| 1151441 | 5/1969 | United Kingdom | 89/36.02 |
| 1327988 | 8/1973 | United Kingdom | |
| 1328626 | 8/1973 | United Kingdom | |
| 2149482A | 6/1985 | United Kingdom | 89/36.02 |

Primary Examiner—John J. Zimmerman
Attorney, Agent, or Firm—Morgan & Finnegan

[57] ABSTRACT

The invention concerns a semi-rigid stratified swinging shield, consisting of at least one layer of a ceramic and/or sintered material, even in the form of a mosaic of adjacent plates (coupled to a carrier), embedded in an elastomeric matrix, said screen being mobile and swinging on one side.

5 Claims, 3 Drawing Sheets

SEMI-RIGID STRATIFIED SHIELD

BACKGROUND OF THE INVENTION

The invention concerns a semi-rigid stratified shield showing improved impact-resistance and/or penetration resistance as well as inhibiting properties against thermal radiation.

More in detail, the object of the invention is the realization of a flexible, stratified semi-rigid shield suited for providing protection to the hull of vehicles, to the hull of aircrafts and to generic structures or to critical parts thereof, either integrative or permanent, in usual protective systems.

The new shield can be used, in particular, in the field of the so-called modern systems, for the protection of motorvehicles such as cars, delivery vans, logistical vehicles, mobile shelters and so on, or as fender and as means for the protection against raising of dust and so on, because of its lightweight and flexibility.

Such shield leads to particularly brilliant results, for instance overall low weight per single unit, flexibility and mobility, compared to the characteristics of the usual protective shieldings at equal protection degree.

On a general line, there are known protective stratified materials, specifically materials structured as a laminate of plastic materials combined with fabrics (of glass, artificial fibres and so on). Nonetheless, in such material there often occur delamination phenomena, during their use, which considerably reduce their efficiency; in other words they prove to be not suitable, for instance, in the case of a low elastomeric module matrix, in those applications where a certain rigidity, a certain surface hardness and a chemical and/or thermal resistance are required.

Object of the present invention is to provide a semi-rigid stratified shield, endowed with special impact and/or penetration resistance, which has to be free from the drawbacks traced in the prior art.

More particularly, the object of the invention is to provide a semi-rigid stratified shield suited for protective systems for persons and/or critical mechanical operational parts in hulls of mobile means, thanks to its adaptability to the structures interested in maximum protective efficiency, with a consistant reduction of the global weight of the same means and so on.

DISCLOSURE OF THE INVENTION

The above and still other goals, which will be clearer to the skilled in the art from the following description, are achieved, according to the invention, by a semi-rigid stratified shield, swinging on one of its sides, consisting of at least one layer of a ceramic and/or sintered material coupled to a mechanical carrier, embedded in an elastomeric matrix.

By this way there is formed a semi-rigid stratified structure, with strong bonds between the different layers, combined with a certain compliance in the direction normal to the layers. A stratified structure of this kind allows a proper distribution of the impact energy dispersing the same energy over a surface by far more wide than the impact surface itself; the absorption of the impact energy increases with the total surface of the successive layers, the bonds of which are perturbed, a consequential directional destabilization being exerted on the impacting body.

The stratified shield is preferably kept at a certain distance from the structure to be protected, said distance being proportional to the size of the impacting body, for instance at least twice its length.

In other words, in the new semi-rigid stratified shield, there occur a sum of actions summarized as follows:

reactivity of the structure to the impact, which develops a succession of elastic response waves, with a speed up to 4000–6000 m/s;

conical distribution of the impact energy, dispersing the load on its structure and composition, the new swinging shield can even minimize the thermal radiation coming from the inside of the protected structure.

The layer or layers of ceramic and/or sintered material may also be constituted, in their turn, by a plurality of plates arranged as a mosaic and contained in a sort of "tray", made of a metal or its alloy, such as for instance aluminum, its alloys, steel and so on, or of plastic materials such as polyethylene, polypropylene, polyvinylchloride and so on.

Said tray, acting as an assembly frame for said plates, may moreover show form and size as required by the type of the foreseen structure and location, taking into consideration the adaptability to the structure of the vehicle.

Just for indicative purposes, the new shield may be technically obtained in a substantially polygonal but preferably quadrangular shape.

The layer of ceramic and/or sintered material is preferably realized by one or more plates of a ceramic material, based on oxides, or on sintered materials based on metal oxides and/or metals.

Last but not least, as far as the carrier is concerned, this latter is made of a material having the function of strengthening the plate or the mosaic of ceramic plates at the moment of the impact or in the case of a breaking.

Said carrier may thus consist of any material suited for a mechanical action, developing a high resistance to the above mentioned stresses, such as for example metals or their alloys, composite materials etc.

A suited material, based on alternated layers of a fabric and of an elastomeric or plastomeric material, is described in European Patent No. 49,014, filed in the name of the Applicant.

The layers forming the new shield are coupled to each other by means of conventional glues interposed between the tray and the ceramic plate and between this latter and the carrier.

The ceramic layer or layers hereinabove are embedded into an elastomeric matrix (natural rubber, synthetic rubbers etc.), according to the techniques of the prior art, and have size and shape suited for the desired shielding.

In order to obtain a better assembly of the shield's structural components, it is possible to embed structural reinforcing elements constituted by a metal net or by a synthetic material, films, polyester, acrylic or poly-olefinic nets, fibrilled films etc.

The thus obtained shield may be fitted with a suitable rigid suspension bar (of metal etc.) around which the shield itself may swing, keeping the shield spaced apart from the structure to be protected at a distance at least twice the length of the impacting body.

The shielding achieved by means of the new shield, all other performance being equal, allows to achieve weight savings even of the order of 40–60%, with respect to conventional metal protections or, at equal weight, it is possible to increase the protective power or capacity and, this latter factor remaining equal, it is possible to keep the weight on macroscopically reduced levels, with obviously considerable advantages for the operational capacity of the protected mobile means.

The simplest way for the installation of the new shield is to fix the corresponding rigid suspension bar to the hull or to the structure of the mobile means by using bolts. There are, however, other possible systems as for instance hinges etc., according to the techniques of the prior art.

BRIEF DESCRIPTION OF THE DRAWINGS

The present invention will now be described in more detail by reference to the figures of the annexed drawings, wherein.

DESCRIPTION OF THE PREFERRED EMBODIMENTS

Figure 1:
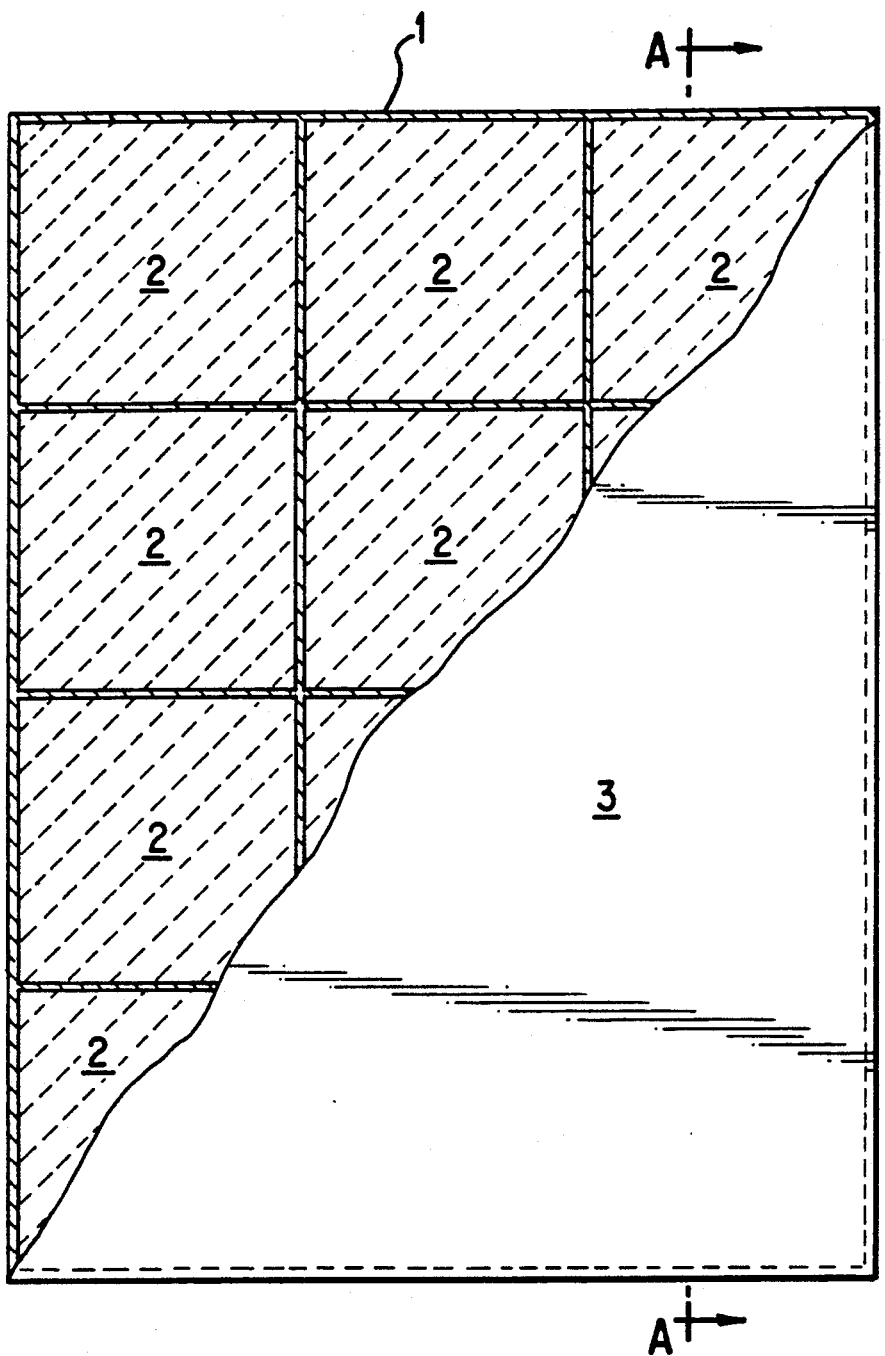
FIG. 1 represents a plan view of an embedded layer according to the invention, partially deprived of the carrier.

More specifically, in FIG. 1 it is represented, in a plan view, an embedded layer according to the present invention (partially deprived of the carrier) consisting of a holding tray (1), containing 12 ceramic plates (2), whose shape is indicated by dotted lines, and on which is superimposed carrier (3), indicated in the drawing by the portion marked by slanting lines (indicating the surface of the structural layer).

Figure 2:
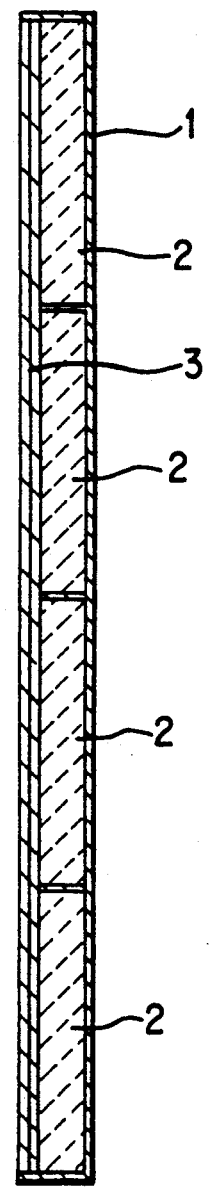
FIG. 2 represents a cross-sectional view of the layer of FIG. 1 according to line A—A'.

In FIG. 2, represented in a cross-sectional view obtained according to line A—A', equal marking numbers correspond to equal parts.

Figure 3:
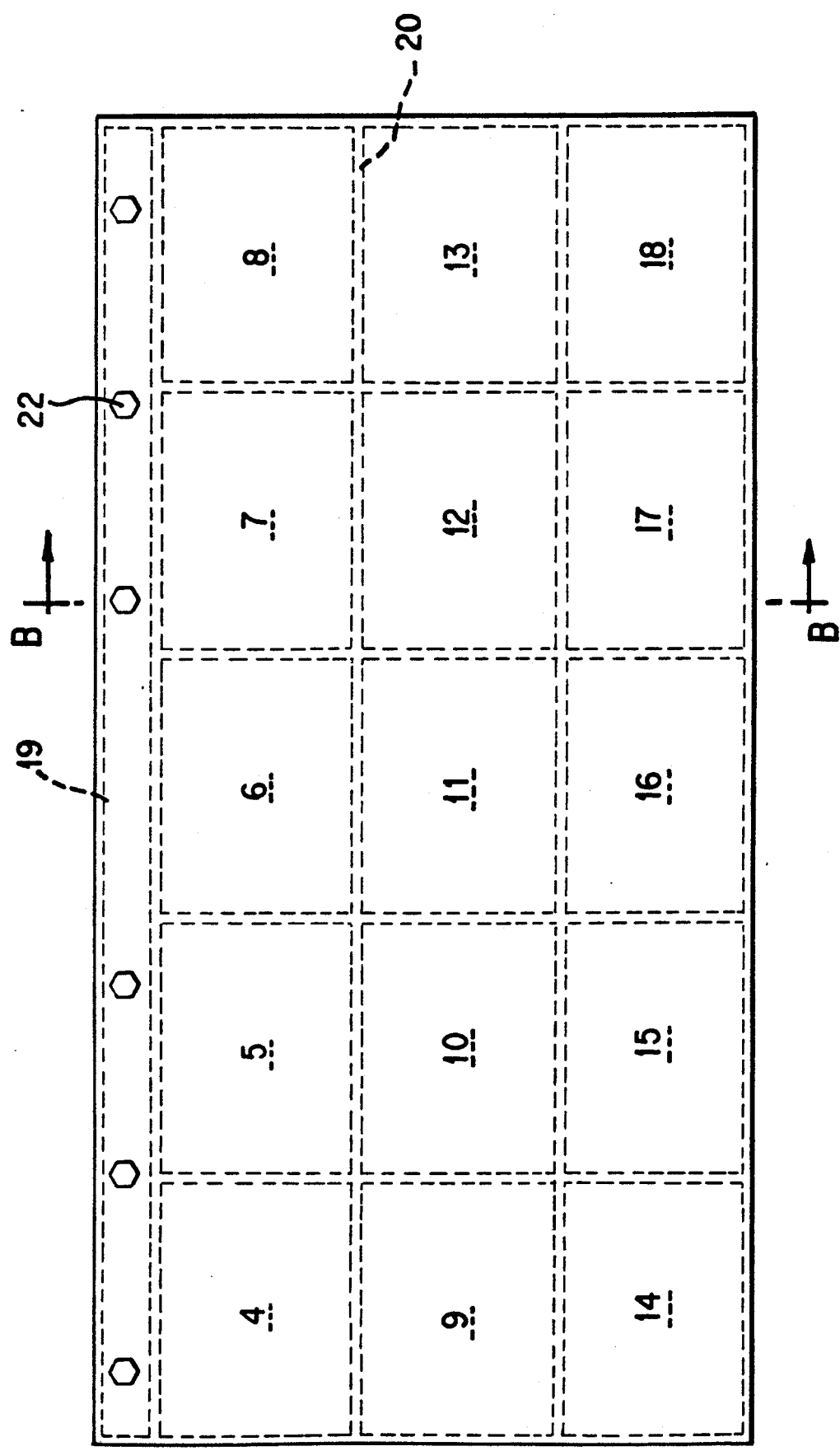
FIG. 3 represents a plan view of the carrier, realized with a plurality of layers according to FIG. 1.
Figure 4:
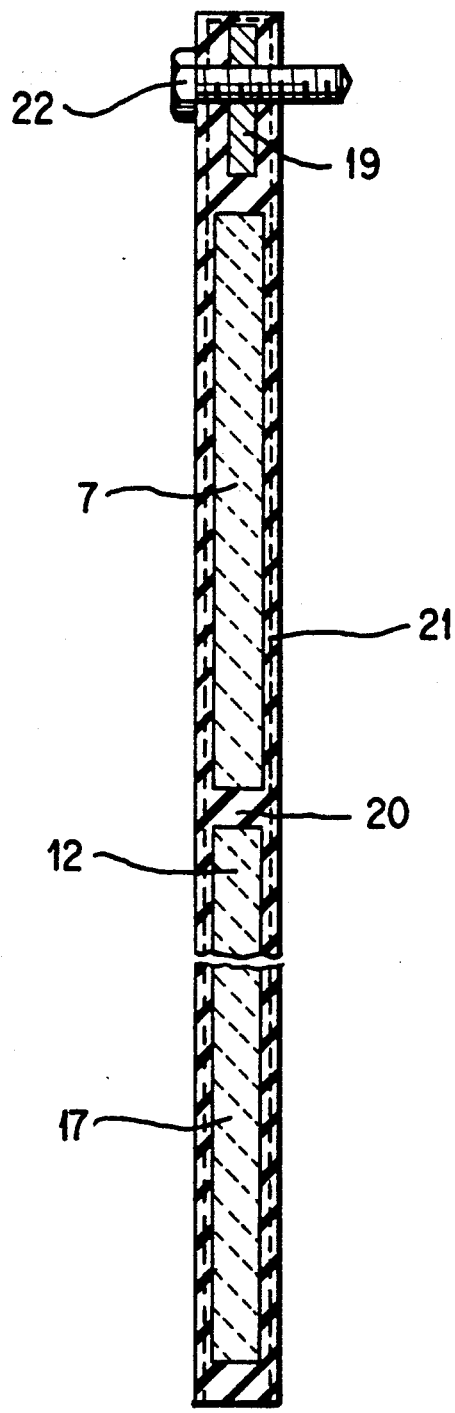
FIG. 4 represents a cross-sectional view of the shield realized according to FIG. 3.

In FIG. 3 it is represented, as a practical form of embodiment of the invention, the plan view of a complete shield.

In said FIG. 3, the integers from 4 to 18 indicate as many layers as according to FIG. 1, while number 19 indicates a metal supporting shaft with 22 bolts, around which the shield is allowed to swing.

Index 20 indicates the elastomeric layer containing a metal reinforcing net (21), into which matrix are embedded the ceramic layers according to the invention.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The references are hereby incorporated by reference.

What is claimed is:

1. Semi-rigid stratified shield, swinging on one of its sides, consisting of a plurality of plates contained in a tray-shaped frame and at least one said tray shape frame embedded into an elastomeric matrix, each plate consisting of a plurality of layers, each made of a material selected from oxide-based ceramics and metal oxide or metal sintered material contained in a frame characterized in that the layers are adhesively coupled to a carrier selected from a metal, and a composite material consisting of alternated layers of a fabric and of an elastomeric material, and a reinforcing element, consisting of a metal or synthetic material that is embedded in the elastomeric matrix.

2. Semi-rigid stratified shield according to claim 1, wherein said layer of ceramic and/or sintered material is contained in a frame consisting of a metal selected from aluminum or its alloys, steel and plastic materials.

3. A shield according to claim 1, wherein said elastomeric matrix is selected from natural and synthetic rubbers.

4. A shield according to claim 3, wherein said elastomeric matrix also contains structural elements selected from metal nets and from nets and films of a synthetic material selected from polyesters, polyolefines and polyacrylates.

5. A shield according to claim 1, wherein it essentially shows a polygonal shape.

* * * * *